United States Patent [19]
Griffin et al.

[11] Patent Number: 5,202,021
[45] Date of Patent: Apr. 13, 1993

[54] INTEGRATED MOLDED COLLAR, FILTER BAG, CAGE AND LOCKING RING ASSEMBLY FOR BAGHOUSES

[75] Inventors: James W. Griffin, Graniteville; Billy A. Bunn, Aiken; Darrell Dunning, Edgefield; Larry E. Patterson, Aiken, all of S.C.

[73] Assignee: Hosokawa Micron International Inc., New York, N.Y.

[21] Appl. No.: 749,607

[22] Filed: Aug. 26, 1991

[51] Int. Cl.[5] .............................................. B01D 29/13
[52] U.S. Cl. .................................. 210/232; 210/323.2; 210/346; 210/486; 210/497.01; 55/376; 55/379
[58] Field of Search ...................... 210/232, 238, 323.2, 210/346, 486, 487, 497.01; 55/361, 374, 376, 378, 379

[56] References Cited

U.S. PATENT DOCUMENTS

| | | | |
|---|---|---|---|
| 4,014,672 | 3/1977 | Jansson | 55/357 |
| 4,197,100 | 4/1980 | Hausheer | 55/382 |
| 4,231,770 | 11/1980 | Johnson, Jr. | 55/302 |
| 4,257,790 | 3/1981 | Bergquist et al. | 55/379 |
| 4,283,282 | 8/1981 | Saint-Dizier et al. | 210/323.2 |
| 4,292,057 | 9/1981 | Ulvestad et al. | 55/302 |
| 4,306,893 | 12/1981 | Fernando et al. | 55/302 |
| 4,309,287 | 1/1982 | Roos et al. | 210/323.2 |
| 4,345,924 | 8/1982 | Margraf | 210/323.2 |
| 4,436,536 | 3/1984 | Robinson | 55/341 R |
| 4,443,237 | 4/1984 | Ulvestad | 55/379 |
| 4,445,915 | 5/1984 | Robinson | 55/378 |
| 4,531,957 | 7/1985 | Malik | 55/360 |
| 4,713,174 | 12/1987 | Zieuers et al. | 210/249 |

FOREIGN PATENT DOCUMENTS 2377832 11/1977 France .
2047114 11/1980 United Kingdom .

Primary Examiner—Robert A. Dawson
Assistant Examiner—W. L. Millard
Attorney, Agent, or Firm—Fitzpatrick, Cella, Harper & Scinto

[57] ABSTRACT

Disclosed is a filter assembly for use in a baghouse having a cell plate provided with openings. The filter assembly includes a molded collar, filter bag, tubular supporting cage and locking ring. The filter bag filters particulate material and extends from below the cell plate. The collar supports the filter bag and has a longitudinally extended portion and a flange portion. The longitudinally extended portion is affixed to the filter bag below the cell plate, while the flange portion extends along the cell plate as a rim above a respective opening. The collar acts as a gasket to seal a respective opening in the cell plate. The tubular supporting cage structurally supports the filter bag and has a longitudinally extended portion and a collar portion. The longitudinally extended portion supports the filter bag, while the collar portion partially overlaps the flange portion of the collar. The locking ring locks the filter bag, collar and cage in place. The locking ring can include a venturi affixed thereto to assist in filtering and cleaning operations.

20 Claims, 4 Drawing Sheets

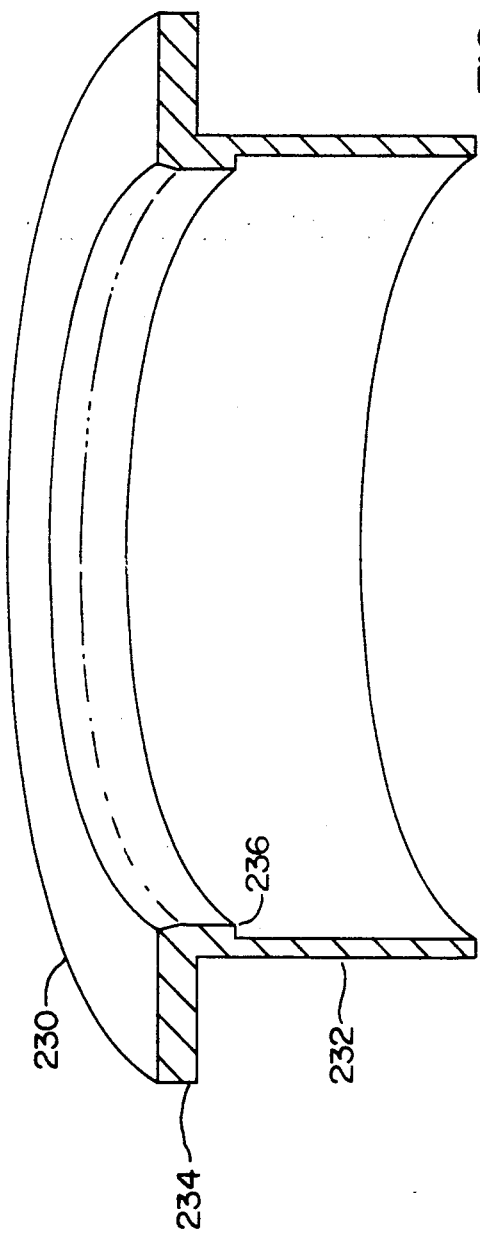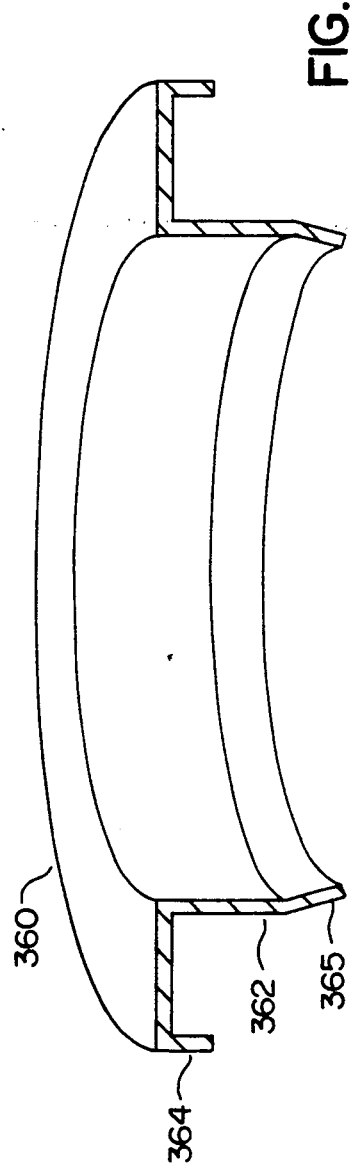

INTEGRATED MOLDED COLLAR, FILTER BAG, CAGE AND LOCKING RING ASSEMBLY FOR BAGHOUSES

BACKGROUND OF THE INVENTION

1. Field of the Invention

The present invention generally relates to a filtering apparatus of the type utilizing elongated baglike tubular filters for filtering particulate material carried in a gas or liquid stream in a filter housing and, more particularly, to an integrated molded collar, filter bag, cage and locking ring assembly for use in baghouses.

2. Description of the Related Art

A filtering apparatus of the type related to the present invention generally includes multiple tubular filter bags mounted in a filter housing or baghouse with each filter bag having a supporting frame or cage positioned therein to hold the filter bag in an open, hollow tubular configuration. The bags are open at an outlet end and closed at their other end. Particulate-laden gas or liquid is directed into the baghouse and through the gas-permeable filter bags. The particulate material is filtered and retained on the exterior surface of the filter bags while the filtered gas or liquid passes through the filter bag. Periodically, a reverse purge of gas or fluid is directed into the open outlet end of the filter bags for dislodging any trapped particulate material from the bags and thus, cleaning the filter bags.

Typically, a filter bag can have a useful life of up to about two years. However, in some filtering applications, the inability to effectively clean the filter bags is so severe that it is necessary to frequently replace the filter bags. Under extreme conditions, such as when the particulate material is of a highly abrasive nature, the filter bags may wear out in a matter of weeks. Thus, the ability to readily remove and replace the filter bags is important.

A common method of locking filter bags in place in the baghouse is by using clamps, locking-strips and similar devices which require special equipment for fastening or unlocking. The locking devices also are generally unwieldy and increase the cost of the filter bag assembly. A typical baghouse may contain hundreds of filter bags. Thus, a large number of such locking devices can be required, and replacement of the filter bags becomes time consuming and costly.

Conventional fastening devices often exhibit sharp edges or wear points which cause breakage or excessive wear of the filter bags with prolonged use. Such fastening devices combined with exposure to vibrations damages the filter bags. In addition, protruding locking devices render cleaning more difficult and cause accidents.

Accordingly, a need has arisen to eliminate the abovenoted drawbacks associated with conventional locking devices, as well as to provide a filter assembly which is easy and inexpensive to install.

Some attempts have been made in the art to overcome such drawbacks. For instance, FIG. 1 shows a cross-sectional view of a conventional double-beaded snap band filter bag and cage assembly for use in baghouses. This conventional filter bag and cage assembly sought to overcome some of the drawbacks associated with the complex locking devices discussed above. However, in so doing, this conventional arrangement has introduced further problems with respect to installation and removal.

In FIG. 1, reference number 100 represents a filter bag assembly for use in a baghouse (not shown). The baghouse includes a cell plate 110, with one of a plurality of generally circular openings 190 shown. The filter bag assembly 100 includes a double-beaded snap band assembly 120 secured at points 135 to the filter bag 140. The filter bag 140 is supported by a cage assembly 150. The cage assembly 150 includes an upper portion 155 that loosely overlaps the double-beaded snap band assembly 120.

The double-beaded snap band assembly 120 includes an upper bead 122 and a lower bead 124. The beads 122 and 124 are generally double beads of felt tape, fiberglass rope or fabric filling. These beads overlap the cell plate 110 around the opening 190. The beads 122 and 124 are adhesively secured to a metal snap band 126. The metal snap band 126 is typically made of stainless steel, or other suitable material, and provides leverage for the seal by applying a radially outward force. The entire double-beaded snap band assembly 120 is covered with a fabric or gasket cuff 128. The cuff 128 is secured to the filter bag at points 135.

The conventional filter bag and cage assembly shown in FIG. 1 has several disadvantages. It is difficult and time consuming to install and is costly to manufacture. Moreover, because the bottom bead 124 lies underneath the cell plate 110, it is extremely difficult to remove the filter assembly 100 from the cell plate 110 without destroying the reusable cage, and practically impossible to remove the filter assembly into the clean, outlet end above the cell plate 110.

To install the conventional filter bag and cage assembly 100 shown in FIG. 1, it is necessary first to compress the metal snap band 126 into a bone-shape. The filter assembly 100 is then dropped into position through the opening 190 in the cell plate 110, and the snap band assembly 120 is released with a snap-action to seat the fabric cuff 128 in the groove between the beads. This snap-action can pinch fingers and is dangerous to the installer. The cage assembly 150 is then dropped into place within the bag. The upper portion 155 of the cage assembly 150 is placed over the filter assembly 100 for protection.

For removal of the filter assembly 100, it is necessary to first remove the cage assembly 150. Then, it is necessary to once again compress the metal snap band 126 into the bone-shape. The filter assembly 100 is then pushed through the cell plate 110 into the dirty area of the baghouse. Such an operation adds cost and time to the removal procedure. Moreover, that operation is undesirable, because it is preferred to remove the bag into the clean, outlet end of the baghouse. In addition, the filter bag 140 often sticks to the cage assembly 150 after use. When sticking occurs, the filter bag and/or the cage must be destroyed for removal of the filter bag assembly 100. This, again, increases costs.

Attempts have been made to eliminate the drawbacks noted above with respect to the double-beaded snap band assembly. For instance, U.S. Pat. No. 4,014,672 discloses a gas filter tube locking apparatus that eliminates both the upper bead from the bag and the overlapping upper portion of the cage assembly in the typical double beaded snap band assembly. However, the gas filter tube locking apparatus in the '672 patent includes the undesirable lower bead that prevents removal of the bag assembly into the clean, outlet end of the baghouse.

The gas filter tube locking apparatus of the '672 patent includes a bag filter attached to a socket. The socket is on the outer extremity of a self-expanding thickening portion. The socket is attached to a semi-annular bulge that constitutes the lower bead. The lower bead contacts the bottom of a cell plate. A collar partially extending over the cell plate holds the gas filter tube in place. However the lower bead in the apparatus of the '672 patent presents the same difficulties in removal as the double-beaded snap band assembly discussed above, i.e., the lower bead prevents upward removal. Accordingly, the expensive and time consuming removal associated with the double beaded snap band assembly has not been overcome by the '672patent.

Moreover, no gasketing is provided between the collar and the cell plate of the filtering device in the '672patent. This can create leaks, should the lower bead fail in any respect, for example, caused by workmen walking on the device, as often occurs.

The locking cylinder and the bag filter in the '672 patent are made of different materials. This increases manufacturing costs. Moreover, the external diameter of the locking cylinder is chosen so that the cylinder can slide into the socket containing the bag filter without damaging the filter, but without much clearance. This requires a very sensitive and time consuming installation. If extreme care is not taken, the bag filter can readily be damaged. This, too, is a severe disadvantage.

Accordingly, a need has arisen to overcome the drawbacks discussed above, and to provide an improved filter assembly for bag houses.

SUMMARY OF THE INVENTION

It is an object of the present invention to overcome the drawbacks and disadvantages discussed above with respect to conventional filter assemblies.

It is another object of the present invention to provide an integrated molded collar, filter bag, cage and locking ring assembly for use in baghouses.

It is a further object of the present invention to provide such an assembly that, at least in part, can be assembled outside of the baghouse, to ease installation.

It is yet another object of the present invention to provide a filter assembly which generates a locked and sufficient seal with an opening in a baghouse cell plate, yet provides for easy removal of the assembly.

It is still another object of the present invention to provide a filter assembly that can be utilized with a venturi to assist in filtration or cleaning operations.

In order to achieve the above-noted objects, the present invention provides a filter assembly for use in a baghouse having a cell plate provided with openings. The filter assembly of the present invention provides an adequate seal and is easy to install and remove. The filter assembly includes a molded collar, a filter bag, a tubular supporting cage and a locking ring. The filter bag separates particulate material carried in gas or liquid which passes through the baghouse. The filter bag extends from below the cell plate longitudinally along a central axis of a respective opening in the cell plate. The collar supports the filter bag and has a longitudinally extended portion and a flange portion. The longitudinally extended portion of the collar is affixed to the filter bag below the cell plate. The flange portion of the collar extends along the cell plate and provides a rim around a respective opening. The collar acts as a gasket to seal a respective opening in the cell plate. The tubular supporting cage structurally supports the filter bag. The cage has a longitudinally extended portion and a collar portion. The longitudinally extended portion of the cage supports the filter bag and the collar portion of the cage partially overlaps the flange portion of the collar. The locking ring includes an annular rim for locking the filter bag and cage at the cell plate along the perimeter of a respective opening, and an annular channel collar for protecting the flange portions of the collar and cage above the cell plate.

In a preferred embodiment, the molded collar and the filter bag are made from compatible materials. Needle felt filter bags are known. Therefore, it is preferred that the material of the molded collar be needle felt comprising polyester and/or polypropylene. It is most preferred that this material be needle felt comprising polyester. However, other organic and/or inorganic materials can be utilized if the installation so requires.

A better understanding of these and other advantages of the present invention, as well as objects attained for its use, may be had by reference to the drawings which form a further part hereto, and to the accompanying descriptive matter in which there are illustrated and described preferred embodiments of the invention.

BRIEF DESCRIPTION OF THE DRAWINGS

FIG. 2 is a cross-sectional view of the molded collar of the present invention.

FIG. 3 is a cross-sectional view of the locking ring of the present invention.

Throughout the views, like or similar reference numbers have been used for like or corresponding parts.

DESCRIPTION OF THE PREFERRED EMBODIMENTS

Figure 1:
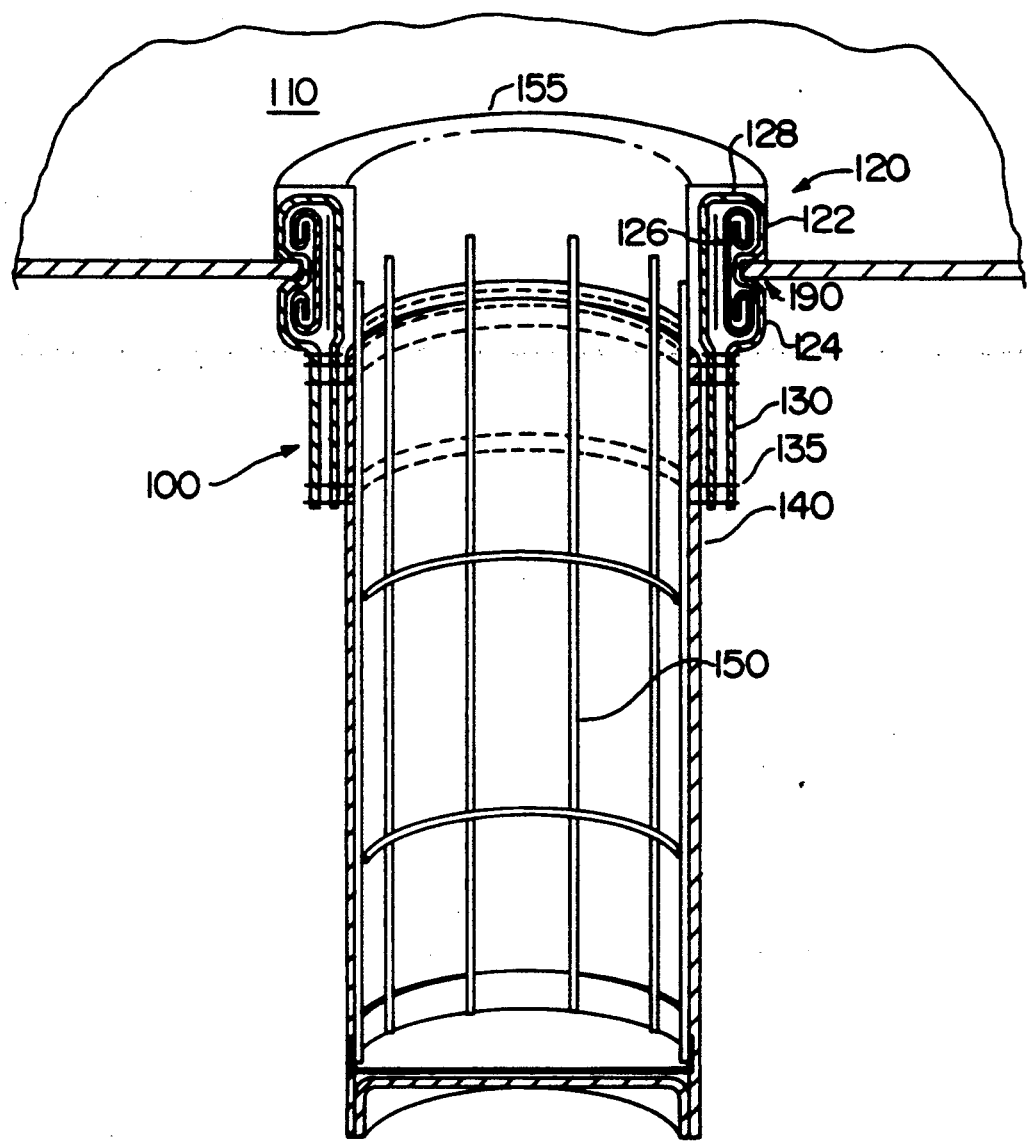
FIG. 1 is a cross-sectional view showing a conventional double-beaded snap band filter bag and cage assembly for use in a baghouse.

Referring now to FIG. 2, a preferred embodiment of the. molded collar of the present invention is generally designated by reference number 230. The collar 230 has a longitudinally extended portion 232 and a flange portion 234. The longitudinally extended portion 232 is affixed to a filter bag (not shown). An annular ledge or notch 236 can be provided to assist in seating the filter bag to the collar 230.

In a preferred embodiment, the collar 230 is molded from needle felt comprising polyester and/or polypropylene. In a most preferred embodiment, the collar 230 is molded from needle felt comprising polyester. Although other inorganic or organic materials can be utilized, if the installation so requires. When the collar is molded from needle felt, a chemical binder can be added to provide the required properties of softness for gasketing and stiffness for support of the filter bag (not shown). This binder can be any cementitious or adhesive material that is soft at high temperatures and hard at room temperatures, such as low density extruded polyethylene or propylene, or gelatin, albumin, agar-agar, gum arabic, alginic acid, polyvinyl alcohol, polyvinyl pyrrolidone, cellulose ethers, partially hydrogenized cellulose acetate, acetate cellulose acetate and the like.

Referring now to FIG. 3, a preferred embodiment of the locking ring of the present invention is generally designated by reference number 360. The locking ring 360 has a longitudinally extended portion 362 and an annular channel collar portion 364. The channel collar 264 fits over elements of the filter assembly (not shown), while the longitudinally extended portion 362 locks the assembly in place, as will be discussed below. Inwardly flared portion 365 is provided to assist in installation of the locking ring 360. Locking ring 360 is preferably made from carbon or mild steel. However, locking ring 360 can be made from aluminum or other metals, or from plastics such as polyvinyl chloride.

Figure 4:
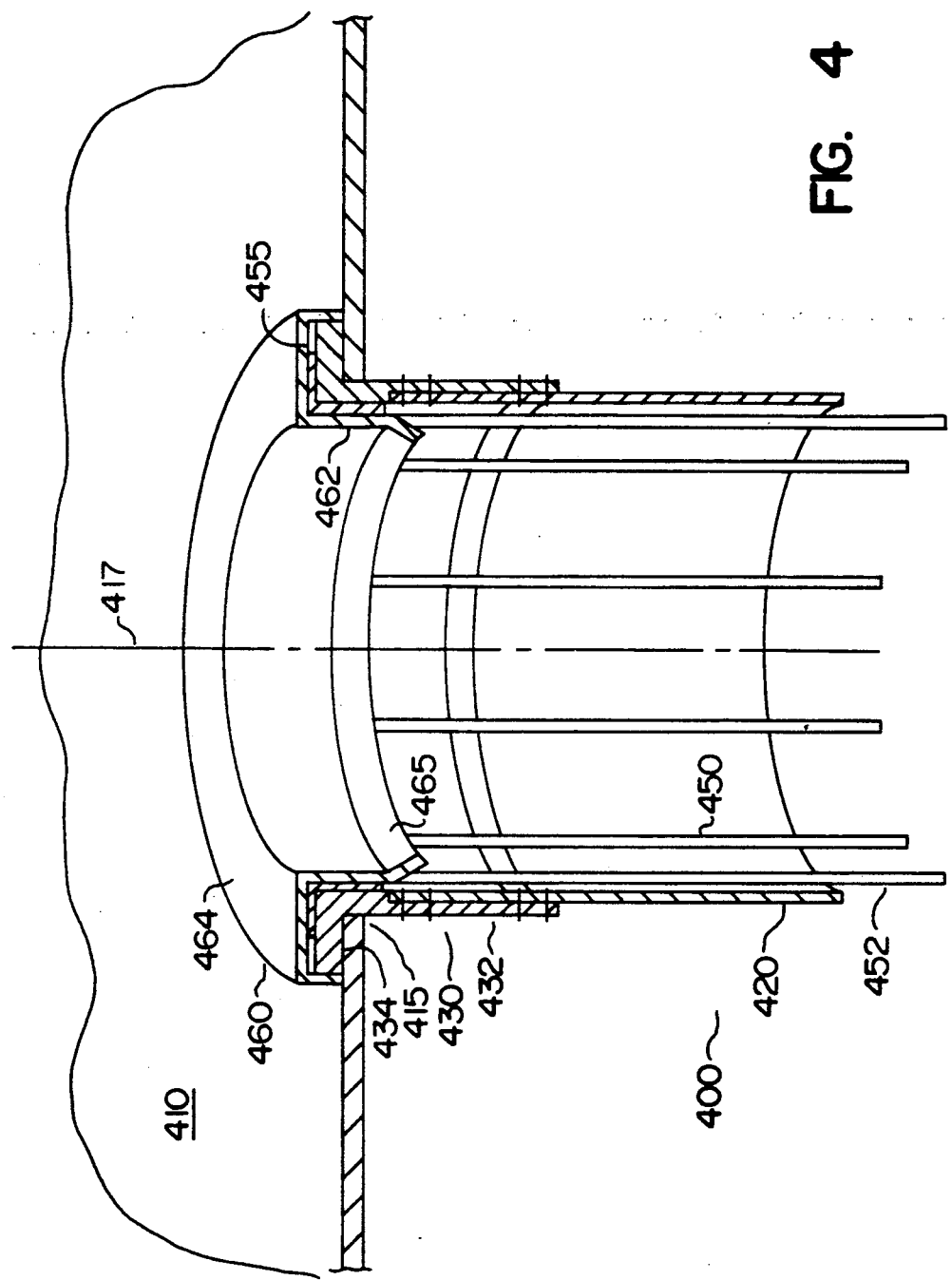
FIG. 4 is a cross-sectional view of the molded collar, filter bag, cage and locking ring assembly according to the present invention.

Referring now to FIG. 4, a preferred embodiment of the molded collar, filter bag, cage and locking ring assembly of the present invention is generally designated by reference number 400. The filter assembly 400 is used in a baghouse (not shown) having a cell plate 410 provided with openings 415. As will be discussed in more detail below, the filter assembly 400 is removably secured to the cell plate 410.

The filter assembly 400 includes a filter bag 420, molded collar 430, tubular supporting cage 450 and locking ring 460.

The filter bag 420 is generally of an elongated or a tubular configuration and is made of a gas permeable fabric. The filter bag 420 filters particulate material carried in gas or liquid passing through the baghouse (not shown). The filter bag 420 extends from below the cell plate 410 longitudinally along a central axis 417 of a respective opening 415 in the cell plate 410.

The molded collar 430 supports the filter bag 420. As discussed above, the collar 430 has a longitudinally extended portion 432 and a flange portion 434. The longitudinally extended portion 432 of the collar 430 is affixed to the filter bag 420 below the cell plate 410. It is preferred that the filter bag 420 be affixed to the collar 430 by heat fusing, sewing, or adhesives. Of course, other techniques known in the art may be utilized to secure the filter bag 420 to the collar 430. The flange portion 434 of the collar 430 extends above the cell plate 410 as a rim around a respective opening 415.

An important aspect of the present invention is that the collar 430 and the filter bag 420 be made from compatible materials. In fact, the filter bag 420 and the collar 430 can be made from the same material In a preferred embodiment, the material of the collar is needle felt comprising polyester and/or polypropylene. In a most preferred embodiment, the material of the collar is needle felt comprising polyester. In this manner, the filter bag 420 readily can be affixed to the collar 430 by heat fusing, sewing or adhesives, for example.

The filter assembly 400 also includes a tubular supporting cage or frame 450. The tubular supporting cage 450 structurally supports the filter bag 420. The supporting cage or frame 450 is of open-work construction to allow gas or liquid flow therethrough, and is typically formed of heavy wire. The cage 450 has a longitudinally extended portion 452 and flange or collar portion 455. The collar portion 455 of the cage 450 contacts and partially overlaps the flange portion 434 of the collar 430. The flange or collar portion 455 of the cage 450 can be slit (not shown) to assist in installation. The cage 450 is positioned inside the tubular filter bag 420 to hold the filter bag 420 in an open configuration, providing structural support to prevent the filter bag 420 from collapsing during a filtering operation.

The configuration of the filter assembly 400 of the present invention allows the supporting cage 450 to be placed within or "dressed" to the filter bag 420 outside of the baghouse, if desired. This significantly facilitates installation of the filter assembly 400 of the present invention.

The filter assembly 400 also includes a locking ring 460 for locking an arrangement of the filter bag 420, collar 430 and cage 450 in place. The locking ring 460 includes an annular rim 462 for locking that arrangement at the cell plate 410 along the perimeter of a respective opening 415 in the cell plate 410. The locking ring 460 also includes an annular channel collar 464 for protecting that arrangement above the cell plate 410. The annular channel collar 464 of the locking ring 460 fits over the flange portion 434 of the molded collar 430 and the collar portion 455 of the cage 450, to protect those elements from above the cell plate 410.

For installation, as discussed above, the supporting cage 450 can be first dressed within the filter bag 420. Alternatively, the filter bag 420 can first be dropped through the opening 415 in the plate 410 and the cage 450 put in place. When the supporting case 450 is first dressed within the filter bag 420, this can be performed outside of the baghouse (not shown) or when the combination is set in place through the opening 415 in the cell plate 410. The cage 450 is inserted until the flange portion 455 contacts the flange portion 434 of the collar 430. Then the locking ring 460 is centered on the central axis 417 of the opening 415 and is pushed in place. The inwardly flared portion 465 of the locking rim 460 assists in this installation. Once in place, the locking ring 460 locks an arrangement of the filter bag 420, the collar 430, and the cage 450 in place by a force fit between annular rim 462 and the opening 415, with the longitudinal portion 432 of the collar in between. Thus, the locking ring 460 locks the arrangement along the perimeter of a respective opening 415 in the cell plate 410.

For ease of installation, an installer need only step on the locking ring 460, for instance, or otherwise apply the required amount of pressure to secure the locking ring 460 in place. As discussed above, the annular rim 462 of locking ring 460 locks the arrangement in place at the cell plate 410, while the annular channel collar 464 protects the arrangement above the cell plate 410.

Once locked in place, the collar 430 acts as a gasket to seal a respective opening 415 in the cell plate 410 due to a compression fit between the annular rim 462 of the locking collar 460 and the opening 415 in the cell plate 410.

Removal of the elements is performed in reverse order and is begun by applying a prying pressure with a tool from beneath the annular channel collar 464 of the locking ring 460. For this purpose, a plurality of notches (not shown) can be formed in the locking ring 460. In this manner, the locking ring 460 is readily removed, and then, the filter bag 420, collar 430 and cage 450 can be removed as a unit into the clean, outlet end of the baghouse. Thus, it is immaterial if the filter bag 420 has fused to the cage 450. This is an improvement over conventional devices.

Figure 5:
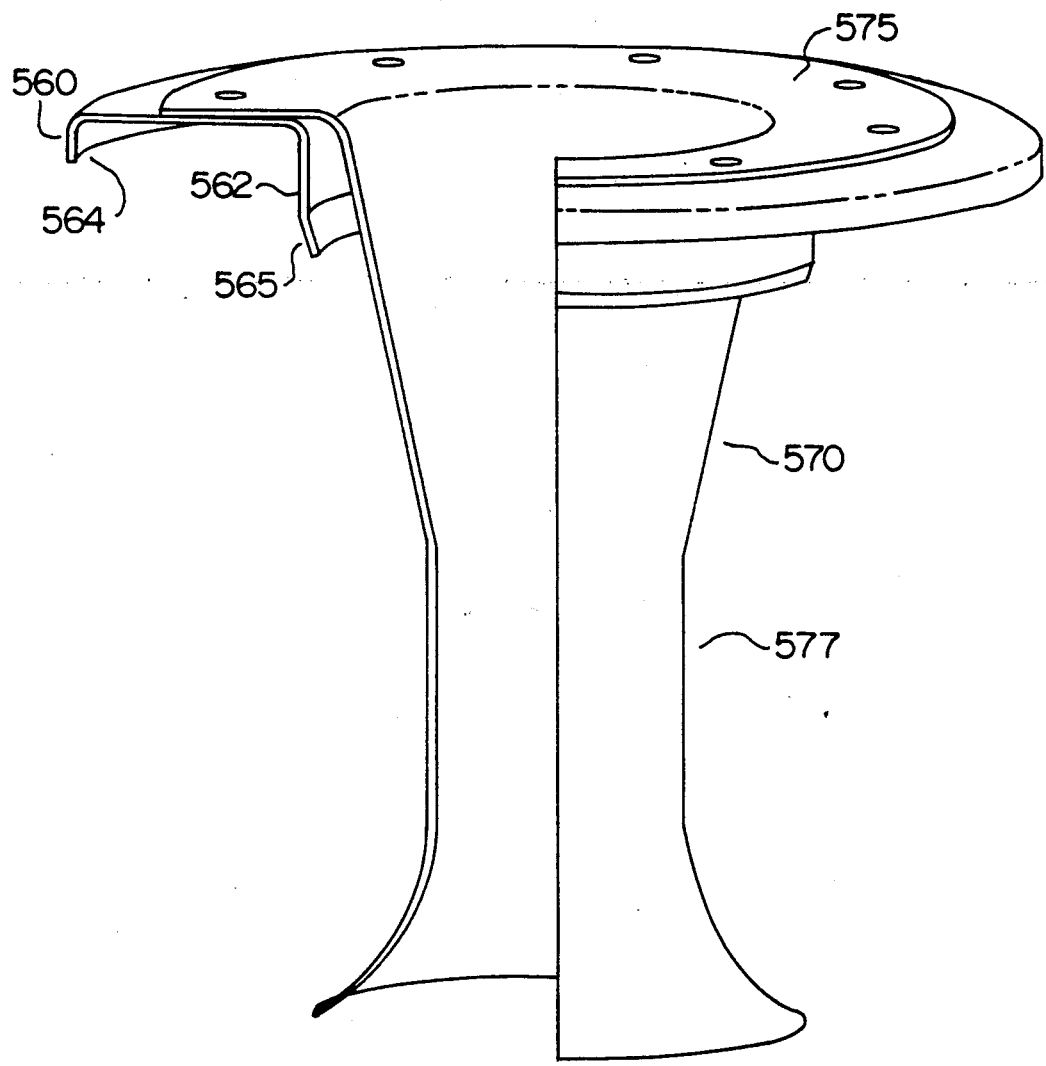
FIG. 5 is a partially broken-away view of an optional venturi affixed to the locking ring of the present invention.

FIG. 5 shows an optional venturi 570 affixed to the locking ring 560 of the present invention. The locking ring 560 includes those features discussed above. For the sake of clarity, discussion of those features will not be repeated. Venturi 570 includes an upper flange portion 575 and a lower venturi or throat portion 577. The flange portion 575 of venturi 570 is affixed to the annular channel collar 564 of the locking ring 560. Affixing can be done by screws, fasteners, rivets, clamps, welding, soldering, brazing and the like. Once the venturi 570 is affixed to the locking ring 560, the two, as a unit, can be installed in place in the manner discussed above with reference to FIG. 4.

As is known in the art, the venturi 570 assists in filtering and cleaning operations. However, it is important that the venturi 570 provide a sufficiently low forward filtering pressure drop and yet provide a jet pumping action necessary for reverse cleaning.

Although certain configurations have been shown and described, such are not limiting. As indicated above, the embodiments discussed are merely representative of embodiments which can be used in the molded collar, filter bag, cage and locking ring assembly of the present invention. It is to be understood that the embodiments which have been disclosed are illustrative only. Therefore, the previously detailed description is provided for illustrative purposes only, and is not intended to be limiting as to the scope of the present invention.

Modifications and variations are contemplated within the scope of the present invention, which is intended to be limited only by the scope of the accompanying claims.

What is claimed is:

1. A filter assembly for use in a baghouse having a cell plate provided with openings, said filter assembly comprising:
   a filter bag for filtering particulate material carried in gas or liquid passing through the baghouse, said filter bag extending from below the cell plate longitudinally along a central axis of a respective opening in the cell plate;
   a collar for supporting said filter bag, said collar having a longitudinally extended portion and a flange portion, the longitudinally extended portion being affixed to said filter bag below the cell plate and the flange portion extending along the cell plate as a rim around a respective opening;
   a tubular supporting cage for structurally supporting said filter bag, said cage having a longitudinally extended portion and a collar portion, the longitudinally extended portion of said cage supporting said filter bag and the collar portion of said cage partially overlapping the flange portion of said collar; and
   a locking ring for locking an arrangement of said filter bag, collar and cage in place, said locking ring including an annular rim for locking said arrangement along the perimeter of a respective opening in the cell plate and an annular channel collar for protecting said arrangement above the cell plate.

2. A filter assembly according to claim 1, wherein said collar and said filter bag are made of compatible materials.

3. A filter assembly according to claim 1, wherein said collar is made from needle felt including at least one of polyester and polypropylene.

4. A filter assembly according to claim 1, wherein said filter bag is affixed to said collar by heat fusing.

5. A filter assembly according to claim 1, wherein said filter bag is affixed to said collar by sewing.

6. A filter assembly according to claim 1, wherein said filter bag is affixed to said collar by adhesives.

7. A filter assembly according to claim 1, wherein said collar comprises a gasket to seal a respective opening in the cell plate by compression fit between the annular rim of said locking ring and a respective opening in the cell plate.

8. A filter assembly according to claim 1, wherein said collar is molded from needle felt and a chemical binder to provide the required properties of softness for gasketing and stiffness for support of said filter bag.

9. A filter assembly according to claim 8, wherein the chemical binder is selected from the group consisting of low density extruded polyethylene and polypropylene.

10. A filter assembly according to claim 1, further comprising a venturi affixed to said locking ring to assist in at least one of a filtering and a cleaning operation.

11. A filter assembly for use in a baghouse having a cell plate provided with openings, said filter assembly comprising:
    a filter bag for filtering particulate material carried in gas or liquid passing through the baghouse, said filter bag extending below the cell plate;
    a molded needle felt collar supporting said filter bag, said collar having a longitudinally extended portion and a flange portion, the longitudinally extended portion being affixed to said filter below the cell plate and the flange portion extending along the cell plate as a rim above a respective opening;
    a tubular supporting cage structurally supporting said filter bag, a collar portion of said cage partially overlapping the flange portion of said collar; and
    a locking ring for locking an arrangement of said filter bag, collar and cage in place, said locking ring including an annular rim for locking said arrangement around the perimeter of a respective opening in the cell plate and an annular channel collar for protecting said arrangement above the cell plate.

12. A filter assembly according to claim 11, wherein said collar and said filter bag are made of compatible materials.

13. A filter assembly according to claim 11, wherein said needle felt collar further includes at least one of polyester and polypropylene.

14. A filter assembly according to claim 11, wherein said filter bag is affixed to said collar by heat fusing.

15. A filter assembly according to claim 11, wherein said filter bag is affixed to said collar by sewing.

16. A filter bag assembly according to claim 11, wherein said filter bag is affixed to said collar by adhesives.

17. A filter assembly according to claim 11, wherein said needle felt collar comprises a gasket to seal a respective opening in the cell plate by compression fit between the annular rim of said locking ring and a respective opening in the cell plate.

18. A filter assembly according to claim 11, wherein said collar is molded from needle felt and a chemical binder to provide the required properties of softness for gasketing and stiffness for support of said filter bag.

19. A filter assembly according to claim 18, wherein the chemical binder is selected from the group consisting of low density extruded polyethylene and polypropylene.

20. A filter assembly according to claim 11, further comprising a venturi affixed to said locking ring to assist in at least one of a filtering and a cleaning operation.

* * * * *